Patented Nov. 10, 1931

1,830,969

UNITED STATES PATENT OFFICE

FREDERICK W. SULLIVAN, JR., AND ELMER W. ADAMS, OF WHITING, INDIANA, ASSIGNORS TO STANDARD OIL COMPANY, OF WHITING, INDIANA, A CORPORATION OF INDIANA

INSECTICIDE

No Drawing.   Application filed July 15, 1926.   Serial No. 122,744.

This invention relates to improvements in insecticides and more particularly to insecticides suitable for the treatment of trees and plants.

In accordance with the present invention, the improved composition comprises a suitable mineral oil, alkali compounds of sulfonic acids derived from the treatment of petroleum oils with sulfuric acid, a suitable colloidal emulsifying agent and water. The quantities of these substances is preferably such as to give a thick emulsion which may be diluted with water before using to give an emulsion suitable for spraying. If desired, the emulsion may also comprise a suitable stomach-poison.

The mineral oil employed is preferably a more or less refined oil suitably of viscosity between 50 and 200 seconds Saybolt at 100° F. For example, the so-called "white oils" of viscosities of about 60 and 80 are eminently suitable for this purpose. As alkali compounds of sulfonic acids derived from the treatment of petroleum oils with strong sulfuric acid may be mentioned the preferentially oil soluble sulfonates of the alkali metals derived from mineral oil in the manner described in Humphreys' U. S. Patent No. 1,286,179 granted November 26, 1918, or in any other suitable manner, or the potassium or sodium compounds of the preferentially water-soluble sulfonic acids, derived from mineral oils in the manner described in U. S. Patent No. 1,474,933 granted November 20, 1923 to Humphreys and others, or in any other suitable manner. The preferred colloidal emulsifying agent is glue, although gelatine, albumen, caseinates, gums such as gum tragacanth, bentonite or other finely divided inorganic materials or other colloidal emulsifying agent may be employed. The compositions preferably contain a trace of toluene or other preservative to prevent decomposition and in some cases, a small quantity of alcohol, although these substances may be omitted, if desired. The preferred stomach-poison, when such is included, is lead arsenate, although any other suitable poison such as Paris green, calcium or magnesium arsenates, fluorides or fluorosilicates may be substituted therefor.

The thick emulsion may suitably contain between 45 and 90% of the mineral oil, between ½ and 5% of the alkali sulfonates, between ¼ and 5% of the emulsifying agent and between 5 and 50% of water. It is to be understood that the invention is not limited to these specific proportions or to these amounts of water because before use, the thick emulsion is considerably diluted with water and it is obvious that the initial emulsion may be prepared with a greater or less degree of dilution, if desired. Where a stomach poison is used, it may amount to between 5 and 20% of the thick emulsion.

The invention will be more readily understood from the following specific examples.

|  | Example I | Example II |
|---|---|---|
|  | Per cent | Per cent |
| Glue | 1.00 | 1.20 |
| Water | 20.00 | 24.00 |
| White oil, 60 viscosity (100° F.) |  | 63.46 |
| White oil, 80 viscosity (100° F.) | 77.77 |  |
| Alcohol |  | .25 |
| Sodium compound of preferentially oil-soluble sulfonates (55%) | 1.23 | 1.64 |
| Lead arsenate |  | 9.45 |
| Toluol | Trace. | Trace. |

The composition may be very readily emulsified or thinned with water; for example passage through a rotary pump is usually sufficient for the production of a very stable emulsion.

For use as a spray, the thick emulsion is diluted with between about 10 and 100 volumes of water, a good distribution being obtained with slight stirring. It is preferred to dilute the thick emulsion with about thirty to fifty volumes of water, which gives an emulsion of approximately 2% oil content.

We claim:

1. An emulsion producing composition effective as an insecticide for plants and trees, comprising a mineral oil, an alkali-metal compound of sulfonic acids derived from mineral oil, a colloidal emulsifying agent, and water.

2. An emulsion producing composition effective as an insecticide for plants and trees, comprising a mineral oil, alkali-metal compound of preferentially oil soluble sulfonates, a colloidal emulsifying agent, and water.

3. An emulsion producing composition effective as an insecticide for plants and trees, comprising a mineral oil, an alkali-metal compound of sulfonic acid derived from mineral oil, glue, and water.

4. An emulsion producing composition effective as an insecticide for plants and trees, comprising a mineral oil, alkali-metal compound of preferentially oil soluble sulfonates, glue, and water.

5. An emulsion producing composition effective as an insecticide for plants and trees, comprising a mineral oil, an alkali metal compound of sulfonic acid derived from mineral oil, a colloidal emulsifying agent, a stomach-poison and water.

6. An emulsion producing composition effective as an insecticide for plants and trees, comprising a mineral oil, alkali-metal compound of preferentially oil-soluble sulfonates, glue, lead arsenate, and water.

7. An emulsion producing composition effective as an insecticide for plants and trees, comprising between 45 and 90% of mineral oil, between ½ and 5% of alkali sulfonates, between ¼ and 5% of emulsifying agent, and between 5 and 50% of water.

8. An emulsion producing composition effective as an insecticide for plants and trees, comprising between 45 and 90% of mineral oil, between ½ and 5% of alkali sulfonates, between ¼ and 5% of emulsifying agent, between 5 and 20% stomach poison and between 5 and 50% of water.

FREDERICK W. SULLIVAN, Jr.
ELMER W. ADAMS.